Nov. 28, 1939.    J. R. MacKAY    2,181,842
ELECTRIC MOTOR APPARATUS
Filed Oct. 7, 1938    2 Sheets-Sheet 1
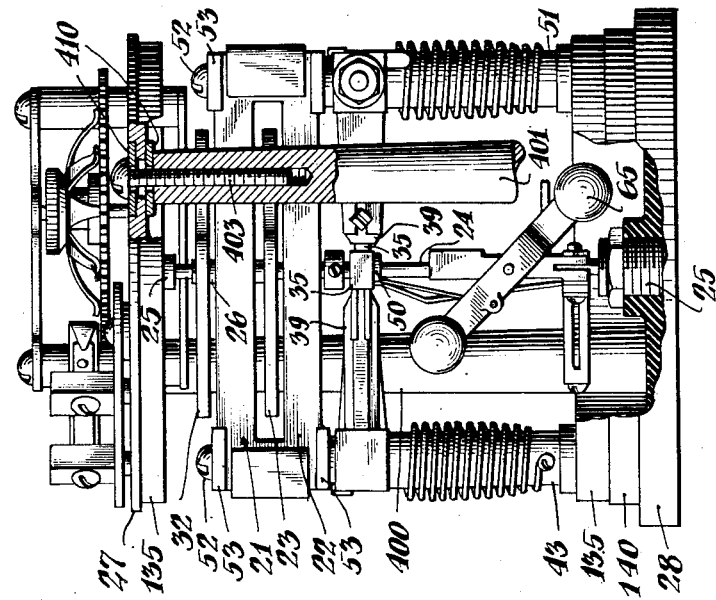
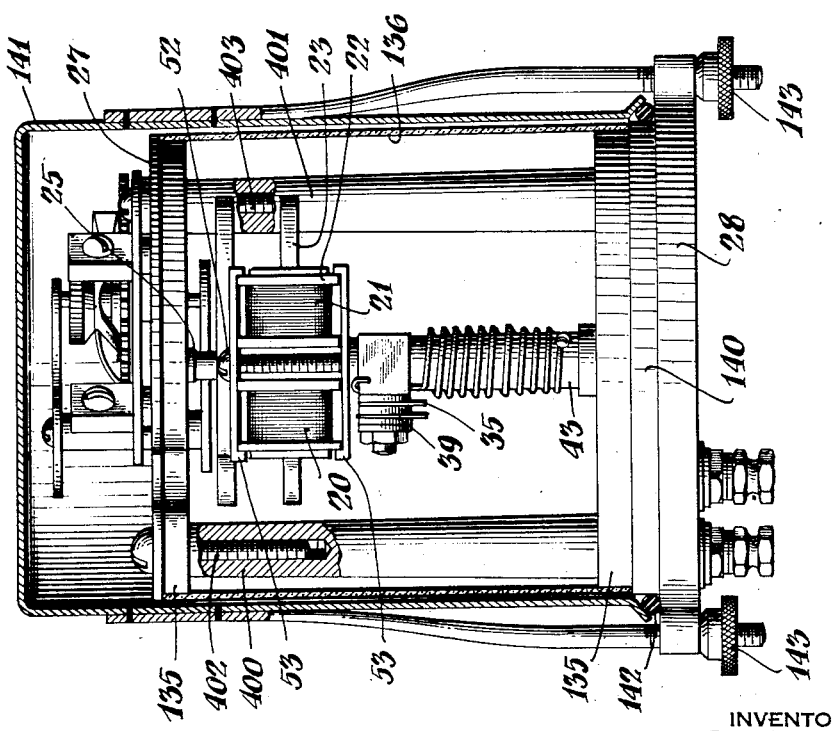
INVENTOR
John R. MacKay
BY
Cooper, Kerr & Dunham
ATTORNEYS Nov. 28, 1939.   J. R. MacKAY   2,181,842
ELECTRIC MOTOR APPARATUS
Filed Oct. 7, 1938   2 Sheets-Sheet 2

INVENTOR
John R. MacKay
BY
Cooper, Kerr & Dunham
ATTORNEYS

Patented Nov. 28, 1939

2,181,842

UNITED STATES PATENT OFFICE 2,181,842

ELECTRIC MOTOR APPARATUS

John R. MacKay, West Caldwell, N. J., assignor to Wallace & Tiernan Products, Inc., Belleville, N. J., a corporation of New Jersey Application October 7, 1938, Serial No. 233,842

5 Claims. (Cl. 172—36)

This invention relates to apparatus of the kind patented in Letters Patent of the United States No. 1,985,357, dated December 25, 1934, for Electric motor apparatus, also to apparatus of the kind described and claimed in the copending patent application of Charles F. Wallace and John R. MacKay, Serial No. 80,264, filed May 18, 1936, for Motors and motor-operated apparatus; and the invention has for certain of its objects to provide improvements in such apparatus.

One of the objects of the invention is to provide novel and simplified arrangements to insure self-starting of the motor, whereby the latter may be started in either of two positions of the rotor; and to provide simplified and more economical means for biasing the rotor to a starting position.

Other objects are to provide novel structure and combinations of elements, in a multi-contact motor arranged for a plurality of energizing periods in each revolution, whereby the chance of failure to start by reason of contact or circuit failure is greatly reduced; and whereby the reliability and range of utility of the apparatus are extended.

Other objects and advantages will appear as the invention is hereinafter disclosed.

Referring to the drawings, which illustrate what is now considered to be an advantageous physical embodiment of the invention:

Fig. 1 is an elevation, with the casings or housings in section and certain parts broken away, of one type of improved motor.

Fig. 2 is a side elevation, with certain parts removed and others shown broken away, of the apparatus shown in Fig. 1.

Figure 4:
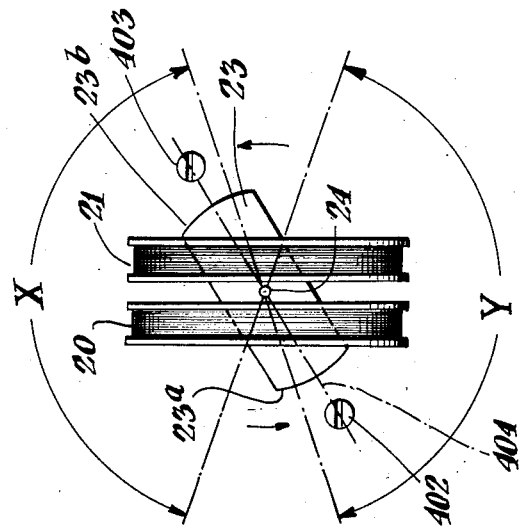
Fig. 4 is a diagrammatic plan view of certain cooperating instrumentalities of the motor.

The motor comprises a stationary electromagnetic field or stator and a rotor. The field comprises the two coils or electromagnets 20, 21 each of which consists of a coil of wire, of suitable size and number of turns dependent on the supply voltage to be employed and the power required, wound on a frame or spool 22 of appropriate insulating material, such as Bakelite. The rotor 23 is permanently magnetized, or poled, is advantageously constructed of metal in the nature of cobalt steel, and is secured to a shaft 24 journaled at its extremities in thrust bearings 25, 25. The rotor 23 is secured to the shaft 24 by means of a bushing 26. If desired, the rotor may be adjustably secured to the shaft by means of a collar and set screws as shown at 15, 16 in the above cited Letters Patent No. 1,985,357. The bearings 25, 25 are each so constructed as to constitute a thrust bearing and they are appropriately axially adjustable, for example, in the manner and for the purpose described in the above identified pending application Serial No. 80,264. The rotor bearings 25, 25, are respectively mounted in corresponding stationary plates 27, 28, which, together with the supporting posts 400, 401, secured intermediate said plates as hereinafter described, provide a supporting frame for the motor mechanism.

Although a single rotor 23 may be employed, for example as illustrated in the above identified Patent No. 1,985,357, the preferred structure illustrated includes a supplemental armature or rotor 32, carried by the shaft 24 of the rotor 23, and secured to said shaft, and comprising a permanent magnet astatically arranged (i. e., oppositely poled) with respect to rotor 23, to provide a flux-localizing means therefor. The supplemental armature or rotor 32 is thus arranged to rotate with the rotor 24, but conveniently exteriorly of the windings 20, 21, within which the rotor 23 moves. The advantages of flux-localizing means of this character, including an avoidance of eddy currents and increase of efficiency, etc., are pointed out in some detail in the cited copending application Serial No. 80,264. Likewise, as there pointed out, the flux-localizing means may be embodied in other forms, for example, one or more non-magnetized iron members supplemental to the rotor 23 and rotatable therewith.

The field coils 20, 21 are automatically intermittently energized so as to produce rotation of the rotor 23, and to that end, two sets of motor contacts are provided. The structure of the contacts illustrated is substantially like that shown and described in the above mentioned pending application Serial No. 80,264, although it will be understood that other types of contacts may be employed, for example as shown in the above cited Patent No. 1,985,357.

In view of the more detailed description of the contacts herein illustrated as the preferred arrangement, to be found in the specification of the cited copending application Serial No. 80,264, it is believed that the following description of these contacts and their operation will suffice in the instant application.

Figure 3:
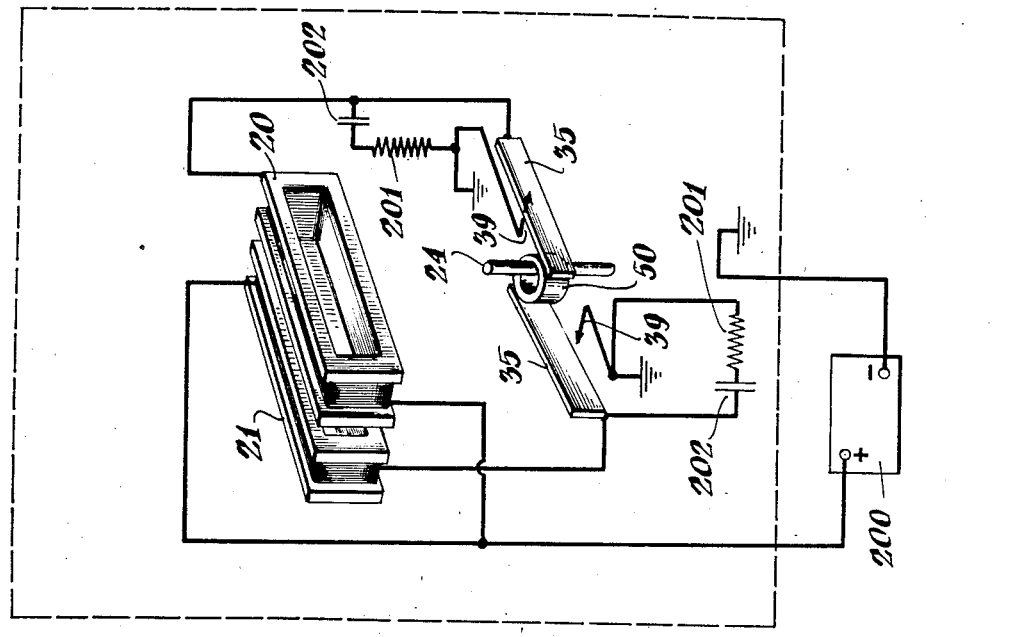
Fig. 3 is a wiring diagram.

The particular electrical connections employed may assume other forms, as for example those described in lines 18 to 34, column 2 of page 4 of the specification of the above cited Wallace Patent No. 1,985,357. However, the form of connections now preferred are illustrated in the wiring diagram (Fig. 3) of the instant application. The two sets of contacts 35—39 are operated by the eccentric 50, of insulating material, whose degree of eccentricity about the axis of the shaft 24 is controlled by the governor 65. These two sets of contacts are alternately operated through the arcs of rotor movement hereinafter described; that is, each set of contacts is closed as the low spot of the eccentric 50 passes the operating arm 35 of that particular set of contacts.

Referring to the wiring diagram (Fig. 3) it will be seen that a battery 200, which may consist of dry cells, is shown with its negative terminal grounded and its positive terminal connected with one terminal of each of the field coils 20, 21. The other terminals of the coils 20, 21 are each connected to a corresponding one of the leaf springs 35, 35 of the two sets of contacts 39—35, 39—35. The contacts 39, 39 are connected to ground. A resistance 201 and a condenser 202, connected in series and shunted across the contacts 35—39, are provided for preventing undesired arcing.

The design and connections are such that one of the coils 20, 21, sets up a field exerting a torque on the rotor or rotors during one-half revolution, and the other of the coils 20, 21, sets up a field exerting a torque on the rotor or rotors in the same direction during the other half revolution. Thus (see Fig. 4) one of the coils 20, 21 is energized when the N pole of the rotor 23 occupies positions in the arc X and the other coil is energized when the N pole of the rotor 23 occupies positions in the arc Y. This causes torque to be exerted upon the rotor during substantially each entire revolution when the load is a maximum, i. e., the torque demand greatest, to maintain the desired predetermined constant speed. When the load is lighter, or the torque demand less, each of the coils 20, 21 will be energized during a lesser portion of the arcs X, Y.

The motor may be utilized to control the flashing of a lamp, as shown and described in the cited copending application Serial No. 80,264 or for other purposes.

The posts 43, 51 are secured to the base 28 and serve not only to support the contact sets 35—39, 35—39, but also to support the coils 20, 21 by means of suitable clamping screws 52 and brackets 53 engageable with the spools upon which the coils are wound. Preferably, the base 28 and the posts 43 and 51 are made of metal in one piece, as by die casting.

Each of the plates 27, 28 is shown provided with a rim or flange 135 around which a sheet 136 of Celluloid or equivalent transparent material is wrapped to form a transparent protective cylindrical casing for the comparatively delicate mechanism mounted therein. The base plate 28 is shown provided with an additional flange 140 adapted to extend into the open end of the cup-shaped metal casing 141 which encloses the entire motor and flasher assembly. A gasket or washer 142 may be provided between the lower edge of the casing 141 and the shoulder provided on the base 28 so as to effect a tight seal when the peripherally spaced bolts 143, 143, are tightened.

Suitable terminals or binding posts are mounted in the plate 28, but insulated therefrom and from each other, so as to facilitate electrical connections.

In the cited Patent No. 1,985,357 and the cited copending application Serial No. 80,264 there was provided a stationary permanent magnet (33 in the cited patent and 152 in the cited copending application) to insure that the rotor (or rotors) would be brought to rest in a position in which the field would be energized when it was again desired to start the motor. According to the present invention an improved method and means for attaining that result and providing more reliable operation under certain circumstances, are herein disclosed and claimed. In the stationary permanent magnet arrangement above referred to the rotors would invariably be brought to rest in the same single angular position and with the N pole of the main rotor 23 always pointing in the same direction. In that position of parts, one of the two sets of motor contacts would be closed in the normal and intended operation so as to cause the proper stator winding energization to insure pick-up and starting of the motor upon closure of the main motor circuit. However, if that particular set of contacts had become dirty or otherwise faulty and failed to close their branch circuit in the single position at which the rotor was brought to rest, the motor would not start automatically as intended. The improved arrangement herein disclosed affords a better chance for the motor to re-start automatically under circumstances such as those just outlined, as will presently appear.

In accordance with the present invention, non-polarized magnetic biasing means are provided, which serve to arrest the rotor in either of two positions from which it may be started. In the structure illustrated, this biasing means comprises a pair of iron screws 402, 403, which serve also to secure the end plate 27 to the respective supporting posts 400, 401. These screws 402, 403, are, as stated, of iron, i. e., magnetizable material, but they are not permanently poled and they will only have such polarity as may be temporarily induced in them by the proximity of the rotor ends with which they cooperate. The designed construction and arrangement are such that when there is no torque being exerted on the rotor or rotors by the stator 20, 21, the magnetizable screws 402, 403 will cause the rotor or rotors to assume an angular position as shown in full lines in Fig. 4 and in which the longitudinal axes of the rotors lie in a plane passing through the dotted line 404 as shown in Fig. 4. However, the rotor or rotors may assume either of two positions, i. e. with the N pole of the rotor 23 at the position 23a, or with the N pole of the rotor 23 at the position 23b (Fig. 4).

Thus bearing in mind that the sets of contacts are respectively closed as one end of the armature 23 (say, the N pole), or more accurately one end of the center line 404, traverses the arcs X and Y in Fig. 4, it will be seen that in either of the two positions of rest the N pole of the rotor 23 will not invariably be in the same single one of the arcs X and Y (and thus effect closure of the same set of contacts) but may be in either of these arcs. If the rotor 23 invariably stopped in the same single position, as in the prior patent and application cited, and the particular set of contacts 35—39 corresponding to that particular arc had become deranged or inoperative the motor would not start automatically. According to the present invention, if one of the two sets of contacts has been deranged the chance that the rotor will have come to rest in such an angular position as to cause resumption of motor operation to take place through the other set of contacts is as good as the chance that the rotor will have come to rest in a position where resumption of starting will not occur due to the particular set of contacts assumed to have become deranged. In other words, in the arrangements disclosed in the cited prior patent and cited prior application, only one of the sets of contacts was utilized in automatic starting, and if that particular set of contacts had become deranged the motor would not start automatically. According to the present invention both of the sets of contacts are employed, one set at any particular time, for causing automatic starting. Therefore, the chance of successful restarting of the motor in spite of a failure of one set of the contacts 35—39 is greatly enhanced.

Again, as pointed out above, the rotor biasing means according to the present invention contribute to simplification of construction and reduction of number of parts by utilizing as the biasing means, the screws 402, 403, which are also a part of the structure of the instrument and have their other functions referred to above. It will be understood, of course, that the screws 402, 403 are received in suitably tapped openings in the posts 400, 401 comprised in the supporting structure of the motor. If the posts 400, 401 and the plate 27 are made of metal, as is preferable in many cases, the insulating washers 410, 410, which insulate the plate 27 from the posts 400, 401, serve to prevent loss of energy due to objectionable loss-producing eddy currents which would otherwise occur. While the astatic arrangement of the rotor structure illustrated greatly reduces losses due to eddy currents that would otherwise occur in connection with the provision of a single rotor 23 with no flux-localizing means, nevertheless the washers 410 may be employed in the circumstances and for the purposes related. The provision of these washers, or similar means, is of even greater importance where a single rotor without any flux-localizing means is employed. The relative angular position of the posts 400, 401 and the screws 402, 403 with respect to the stator coils 20, 21, is clearly shown in plan view in Fig. 4, it being understood that the posts lie directly under the screws 402 and 403 as there shown.

It will be appreciated that the non-polarized biasing means may assume other forms; for example, particularly where only a single rotor element 23 is employed, a non-polarized bar of ferrous material, such as soft iron, may be provided in the same position as the permanent magnet biasing bar 33 of the cited patent or like bar 152 of the cited pending application.

It will be understood that details of construction of other parts of the apparatus not herein specifically described—for example, other parts shown in the drawings—may conveniently be such as are described in the copending application Serial No. 80,264, hereinabove cited. It will be further understood that various features herein illustrated or described are being claimed broadly in the said co-pending application Serial No. 80,264, viz., the arrangement of a statically disposed permanent magnets or other flux-localizing means for the rotor, the arrangement of successively energized field windings, the various features of contact structure and mounting means therefor, and the double housing arrangement for the motor.

In accordance with the provisions of the patent statutes, I have herein described the principle of operation of my invention, together with the apparatus which I now consider to represent the most advantageous embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use within the scope of the appended claims.

What I claim is:

1. An electric motor comprising in combination, a stator including an air core solenoid, a permanently magnetized rotor mounted for rotation within said stator, means controlled by rotation of said rotor for energizing said stator more than once during each rotor revolution to produce a torque upon and rotate said rotor, and means biasing said rotor to one or another of a plurality of starting positions in cooperation with said first mentioned means.

2. An electric motor comprising in combination, a stator having a plurality of air-core field windings, a permanently magnetized rotor mounted for rotation within said stator, means controlled by rotation of said rotor for successively energizing said field windings one at a time to produce a torque upon and rotate said rotor, and magnetizable means biasing said rotor to one or another of a plurality of starting positions in cooperation with said first mentioned means.

3. An electric motor comprising in combination, air core stator means, a permanently magnetized rotor mounted for rotation within said stator means, a set of contacts controlled by rotation of the rotor for causing stator energization during one portion of a rotor revolution, another set of contacts controlled by rotation of the rotor for causing stator energization during another portion of the rotor revolution, and magnetizable means for biasing the rotor into one or another of a plurality of positions for respectively operating one or another of said sets of contacts to start the motor.

4. An electric motor comprising air core stator means, a permanent magnet rotor mounted for rotation within said stator, means controlled by rotation of said rotor for effecting an energization of said stator means during one part of a revolution, and for effecting another energization of said stator means during an opposite part of a revolution, and non-polarized means for magnetically biasing said rotor in a predetermined starting plane transverse of its axis of rotation, whereby the rotor is arrested in one or another of opposite positions respectively adapted to effect one or another of the aforesaid energizations.

5. An electric motor comprising in combination, a plurality of air core field windings, a permanently magnetized rotor mounted for rotation within said field windings, means controlled by rotation of said rotor for successively energizing said field windings one at a time to produce a torque upon and rotate said rotor, spaced frame members for supporting the motor, and means securing the frame members together including non-polarized magnetizable securing means disposed for magnetically biasing said rotor into one or another of a plurality of starting positions in cooperation with said first mentioned means.

JOHN R. MacKAY.